United States Patent
McMillan et al.

(10) Patent No.: US 7,538,461 B2
(45) Date of Patent: May 26, 2009

(54) BRAKE MECHANISM FOR ELECTRIC MOTOR

(75) Inventors: Douglas deHaas McMillan, St. Paul, MN (US); David Lawrence Dahlen, Spring Valley, WI (US)

(73) Assignee: McMillan Electric Company, Woodville, WI (US)

( * ) Notice: Subject to any disclaimer, the term of this patent is extended or adjusted under 35 U.S.C. 154(b) by 250 days.

(21) Appl. No.: 11/313,429

(22) Filed: Dec. 20, 2005

(65) Prior Publication Data

US 2007/0138884 A1    Jun. 21, 2007

(51) Int. Cl.
*H02K 7/102* (2006.01)
*F16D 59/00* (2006.01)

(52) U.S. Cl. .................. 310/77; 188/170; 477/7
(58) Field of Classification Search ........... 310/77, 310/93; 188/70 B, 71.1, 72.3, 72.7, 73.1, 188/73.37, 170, 171; 477/7
See application file for complete search history.

(56) References Cited

U.S. PATENT DOCUMENTS

| | | | |
|---|---|---|---|
| 736,461 A | 8/1903 | Thresher | |
| 2,172,440 A | 9/1939 | Edmondson | |
| 2,793,306 A | 5/1957 | Bolech | |
| 3,032,667 A | 5/1962 | Sorchy | |
| 3,626,220 A | 12/1971 | Niculescu | |
| 3,695,332 A * | 10/1972 | Bahnsen | 160/188 |
| 4,059,339 A | 11/1977 | Brown | |
| 4,103,763 A * | 8/1978 | Glockner et al. | 477/7 |
| 4,362,974 A | 12/1982 | Dietz | |
| 4,460,838 A | 7/1984 | Ulicny | |
| 4,720,647 A | 1/1988 | Plumer | |
| 4,838,391 A * | 6/1989 | Schenk | 188/171 |
| 5,406,180 A | 4/1995 | Feller, Jr. | |
| 5,529,157 A | 6/1996 | Desrochers | |
| 5,982,063 A | 11/1999 | Lutz et al. | |
| 6,273,221 B1 * | 8/2001 | Schmidt | 188/170 |
| 6,411,004 B1 | 6/2002 | Liau | |
| 6,417,595 B1 | 7/2002 | Wasson | |
| 6,459,182 B1 | 10/2002 | Pfann et al. | |
| 6,515,385 B2 * | 2/2003 | Kuivamaki | 310/77 |
| 6,700,246 B1 * | 3/2004 | Bruhn | 310/77 |

* cited by examiner

*Primary Examiner*—Tran N Nguyen
(74) *Attorney, Agent, or Firm*—Merchant & Gould P.C.

(57) ABSTRACT

An electrical motor includes a sleeve, a rotational assembly located in the sleeve, and a shaft rotatably mounted about an axis extending longitudinally through the sleeve. The motor also includes an endcap, and a brake mechanism located about the axis of the shaft, the brake mechanism including a spring and a first bushing, wherein the spring forces the first bushing against the endcap to create a static frictional torque between the first bushing and the endcap when the motor is in an off state.

18 Claims, 7 Drawing Sheets

BRAKE MECHANISM FOR ELECTRIC MOTOR

TECHNICAL FIELD

Embodiments disclosed herein relate generally to electric motors.

BACKGROUND

Electric motors are typically used to affirmatively drive structures from one position to another position. However, in some applications, electric motors are also used as brake mechanisms to hold structures in a given position when the motor is in an off state (i.e., when power is not applied and the motor is not in use). There are various reasons why it may be desirable to provide a braking mechanism in an electric motor.

For example, in one typical application, an electric motor is used to raise and lower a garage door. Heavy springs are used to reduce the force required to raise the door and to help keep the door in the raised position. However, variations in installation, the spring constant of the heavy spring, and the effects of aging often result in a spring force that is insufficient to maintain the door in the required position.

Manufacturers may require that the electric motor used to raise and lower the garage door be configured to hold a specified portion of the weight of the door in the raised position. For example, in the off state, an electric motor can be required to hold a certain amount of weight (e.g., a ninety-pound negative force) applied to the door after it has been raised.

The gear ratio in the drive train and the natural reluctance for the shaft of the motor to rotate in the off state (including the forces exerted by the brushes on the commutator and the magnets) provide some of the necessary resistance to movement when the motor is in the off state. However, these forces can be inadequate in some applications to maintain the load in the desired (i.e., raised) position.

SUMMARY

Embodiments of the present invention relate generally to electric motors.

According to one aspect, an electrical motor includes a sleeve, a rotational assembly located in the sleeve, and a shaft rotatably mounted about an axis extending longitudinally through the sleeve. The motor also includes an endcap, and a brake mechanism located about the axis of the shaft, the brake mechanism including a spring and a first bushing, wherein the spring forces the first bushing against the endcap to create a static frictional torque between the first bushing and the endcap when the motor is in an off state.

According to another aspect, an electrical motor includes a sleeve, a rotational assembly including an armature and a commutator located in the sleeve, and a shaft rotatably mounted about an axis extending longitudinally through the sleeve. The motor also includes an endcap defining an opening through which the shaft extends, and a brake mechanism located about the axis of the shaft and between the armature and the endcap, the brake mechanism including a coil compression spring and a first bushing impregnated with a lubricant, wherein the spring forces the first bushing against the endcap to create a static frictional torque between the first bushing and the endcap when the motor is in an off state.

According to yet another aspect, a method for creating a static holding torque in an electric motor including a rotational assembly and a shaft includes: locating a spring and a bushing about the shaft of the motor; forcing the bushing against a stationary portion of the motor using the spring to create the static holding torque with the motor in an off state; and decreasing the static holding torque between the bushing and the stationary portion as the shaft of the motor rotates when the motor is in an on state.

DETAILED DESCRIPTION

Embodiments disclosed herein relate generally to electric motors. While the disclosure is not so limited, an appreciation of the various aspects of the disclosure will be gained through a discussion of the examples provided below.

Referring now to FIGS. 1-4, an example embodiment of an electric motor 100 is shown. Although example electric motor 100 is a permanent magnet direct current ("DC") motor, other types of motors can be used. Examples of other types of motors include, without limitation, universal motors, brushless motors, and AC synchronous motors.

Electric motor 100 generally includes a housing 110 with a sleeve 115 and endcaps 120, 130 that enclose a rotational assembly 121 including a commutator 122 and an armature 118. Permanent magnets (not shown) are mounted adjacent to armature 118. Additionally, brush assemblies including conductive brushes (also not shown) are mounted adjacent to commutator 122.

A shaft 140 is rotatably disposed within bearings 144, 146. Shaft 140 can project from apertures in one or both of endcaps 120, 130. Bearing 146 is maintained in an axial position by a spring 148 that is positioned by an axial member 149 (see FIG. 4).

Endcaps 120, 130 can be coupled to sleeve 115 using fasteners, such as a nut and bolt fastening system. For example, in one embodiment, a bolt clamps endcaps 120, 130 together with sleeve 115 to form an integrated unit. Other configurations are possible.

Additional details regarding an example permanent magnet DC motor such as motor 100 are provided in U.S. Pat. No. 6,417,595 to Wasson, the entirety of which is hereby incorporated by reference.

Also included in electric motor 100 is an example brake mechanism 300. Referring now to FIGS. 2-9, brake mechanism 300 is shown in more detail. Generally, brake mechanism includes bushings 310, 330, a spring 320, and a washer 340.

Generally, bushings 310, 330 are positioned on shaft 140 and rotate therewith. Spring 320 is located between bushings 310, 330. Bushing 310 is axially located by a shoulder 135 formed in shaft 140. As described further below, in a compressed state between bushings 310, 330, spring 320 exerts a pushing or biasing force against bushings 310, 330 in opposite axial directions. For example, spring 320 forces bushing 330 in an axial direction A (see FIGS. 2 and 4) towards washer 340 to create a braking force on motor 100.

Figure 1:
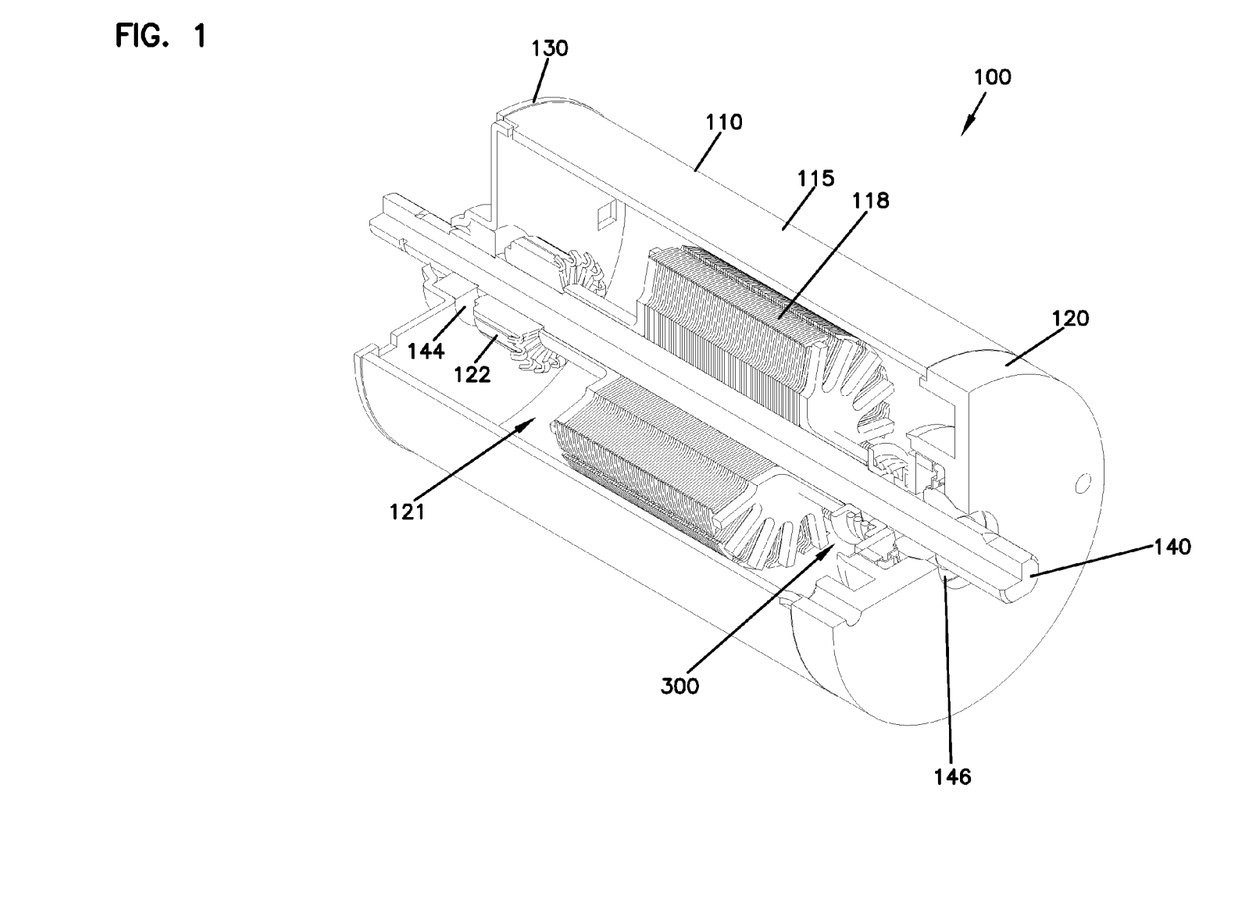
FIG. 1 is a partial cutaway view of an example electric motor.
Figure 2:
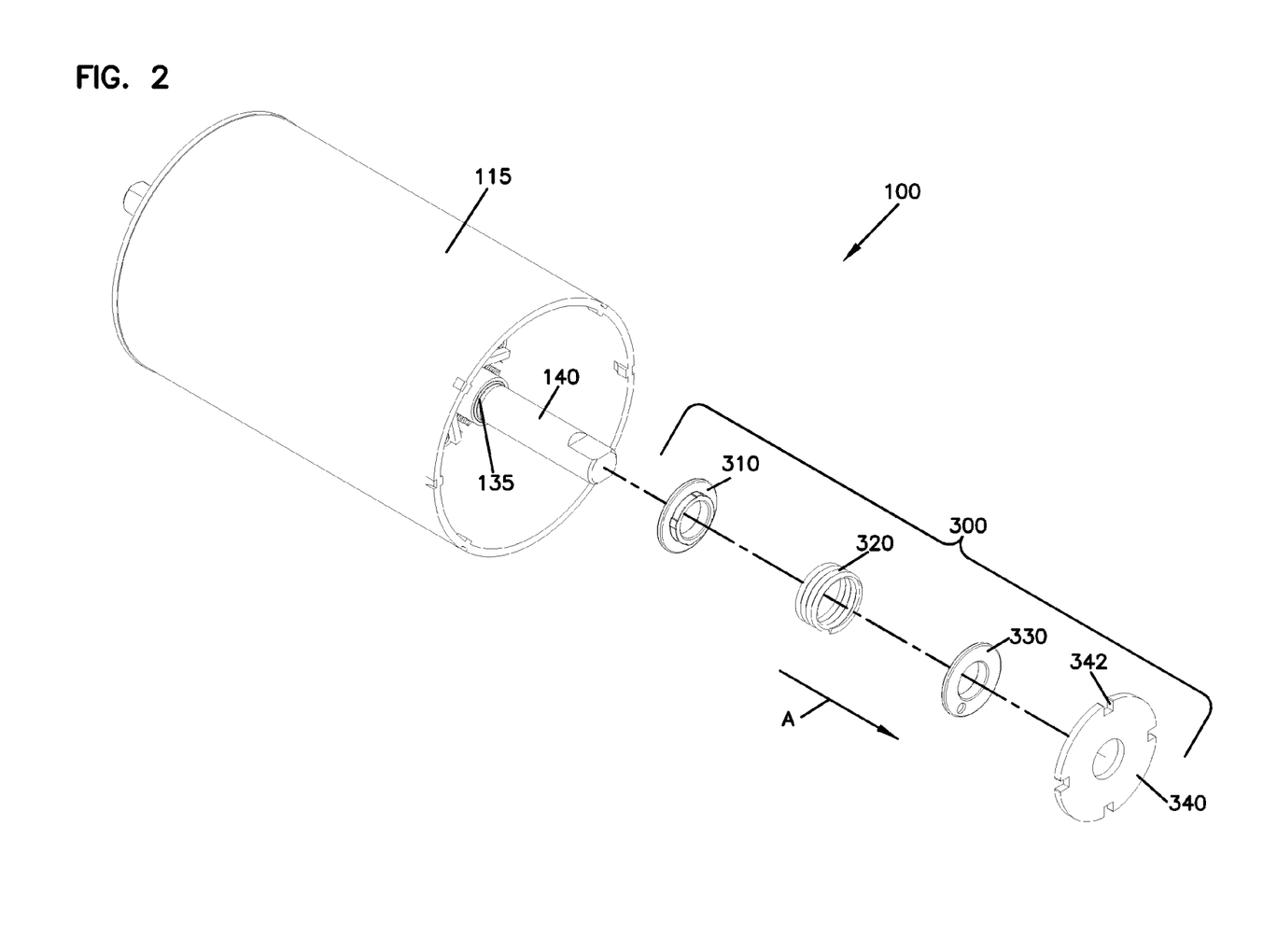
FIG. 2 is an exploded view of the motor of FIG. 1.
Figure 5:
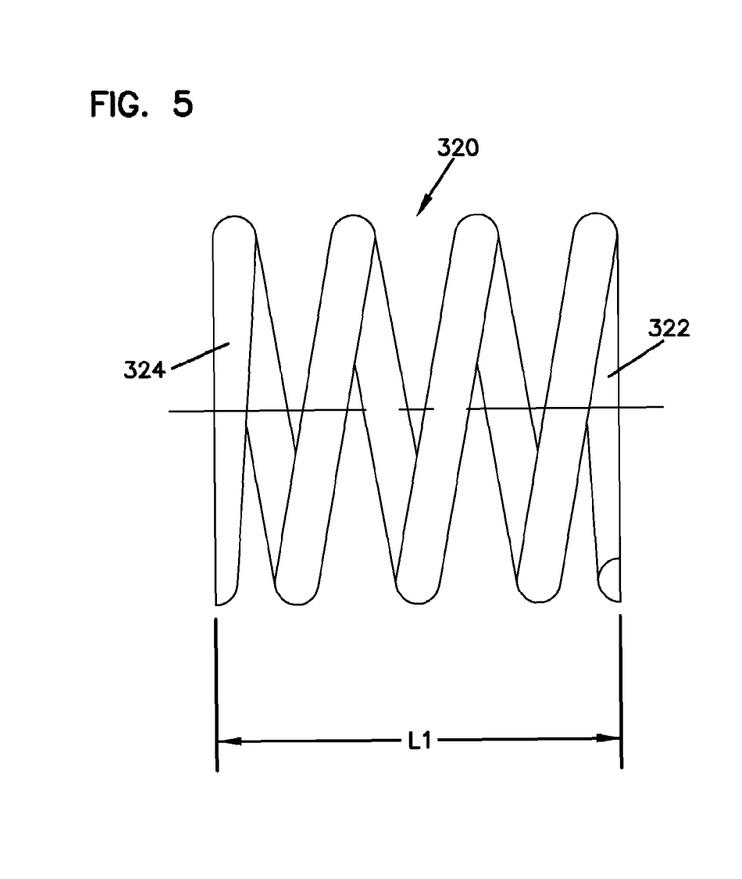
FIG. 5 is a view of an example spring.
Figure 6:
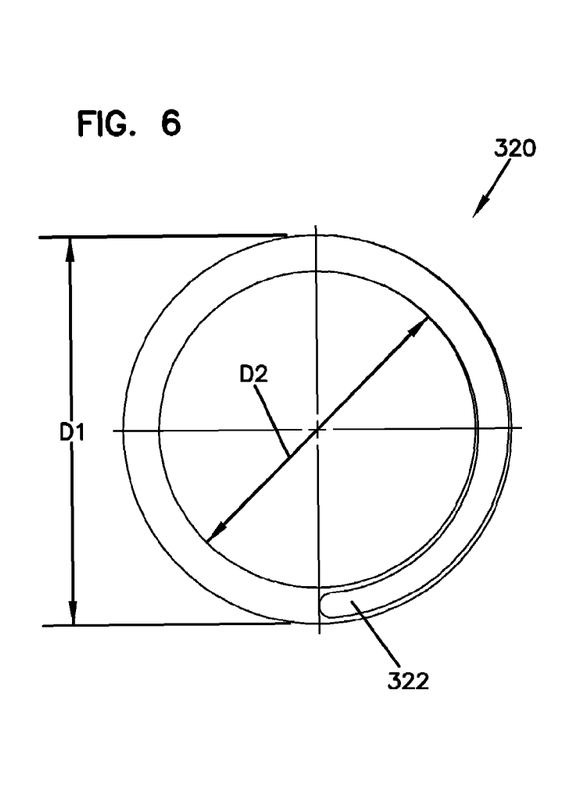
FIG. 6 is an end view of the spring of FIG. 5.

Referring now to FIGS. 2, 5, and 6, spring 320 is shown. Spring 320 includes a first end 322 and a second end 324. In the example shown, spring 320 is a coil compression spring, although other types of springs can be used.

As shown, in some embodiments, first and second ends 322, 324 of spring 320 are ground to include a square surface to sit flush again bushings 310, 330. In other embodiments, spring 320 instead includes additional coils at first and second ends 322, 324 to create flush surfaces. In yet other embodiments, spring 320 is uniform throughout its entirety.

In the example shown, spring 320 is made of zinc-plated wire. For example, in one embodiment, spring 320 is made of a tempered spring steel. In some embodiments, spring 320 includes a corrosion-resistant coating such as, for example, zinc. In the example shown, spring 320 is made of 0.067 inch zinc-plated wire.

Example spring 320 includes an inner diameter D2 of 0.586 inches, an outer diameter D1 of 0.720 inches, and a length L1 of 0.75 inches. In the examples shown, spring 320 has a spring rate of approximately 50 lbs./inch and exhibits a load of 21.6 lbs. when spring 320 is compressed to 0.326 inches in length.

Other sizes, types, and materials can be used for spring 320.

Referring to FIGS. 2 and 7-9, bushing 330 is shown. Example bushing 330 includes a main body 332 and a protuberance or boss 334. Boss 334 is sized to be received by spring 320 (see FIG. 4) to locate spring 320 with respect to bushing 330. Spring 320 engages a surface 336 of bushing 330.

Figure 7:
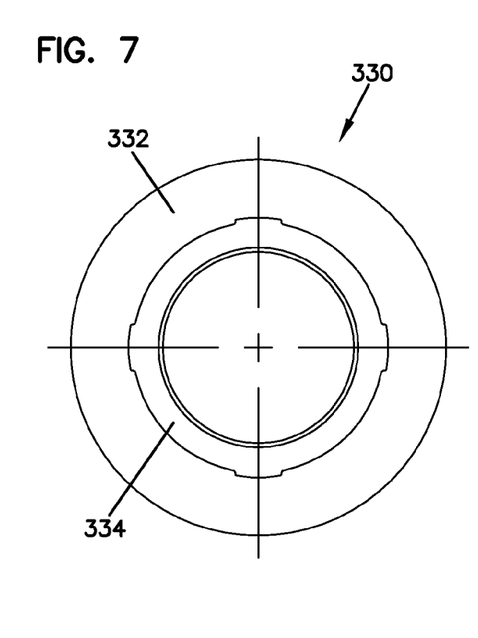
FIG. 7 is a view of an example bushing.
Figure 8:
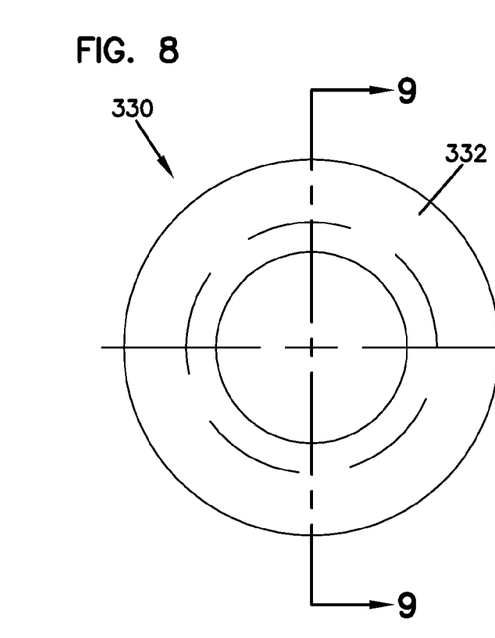
FIG. 8 is another view of the bushing of FIG. 7.
Figure 9:
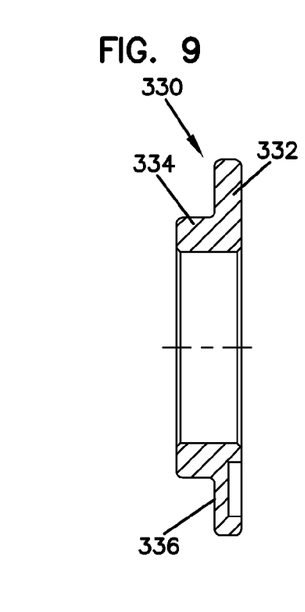
FIG. 9 is a cross-sectional view taken along line 9-9 of the bushing of FIG. 8.

In example embodiments, bushing 330 can exhibit lubricity so that the frictional force between bushing 330 and washer 340 decreases as bushing 330 increasing in rotational speed along with shaft 140, as described below. For example, in one embodiment, bushing 330 is made of bronze, such as SAE 841 bronze. In the example shown, bushing 330 is impregnated with a lubricant so that bushing 330 is self-lubricating. For example, bushing 330 is impregnated with 20 to 25 percent SAE 30 oil by volume. In alternative embodiments, other materials can be used. For example, in one alternative embodiment, bushing 330 can be made of a polymeric material that exhibits an increased lubricity, such as a polymer including the Dyneon™ Polymer Additive manufactured by Dyneon LLC of Oakdale, Minn.

Referring again to FIGS. 2 and 3, in the example shown, washer 340 includes notches 342 that engage projections 352 of holder 350 to fix washer 340 rotationally with respect to endcap 120. In some embodiments, example washer 340 is a steel washer. In the illustrated embodiment, washer 340 is a thrust washer made of hardened steel. Other materials can be used. For example, in some embodiments washer 340 can be made of materials exhibiting lubricity.

Figure 3:
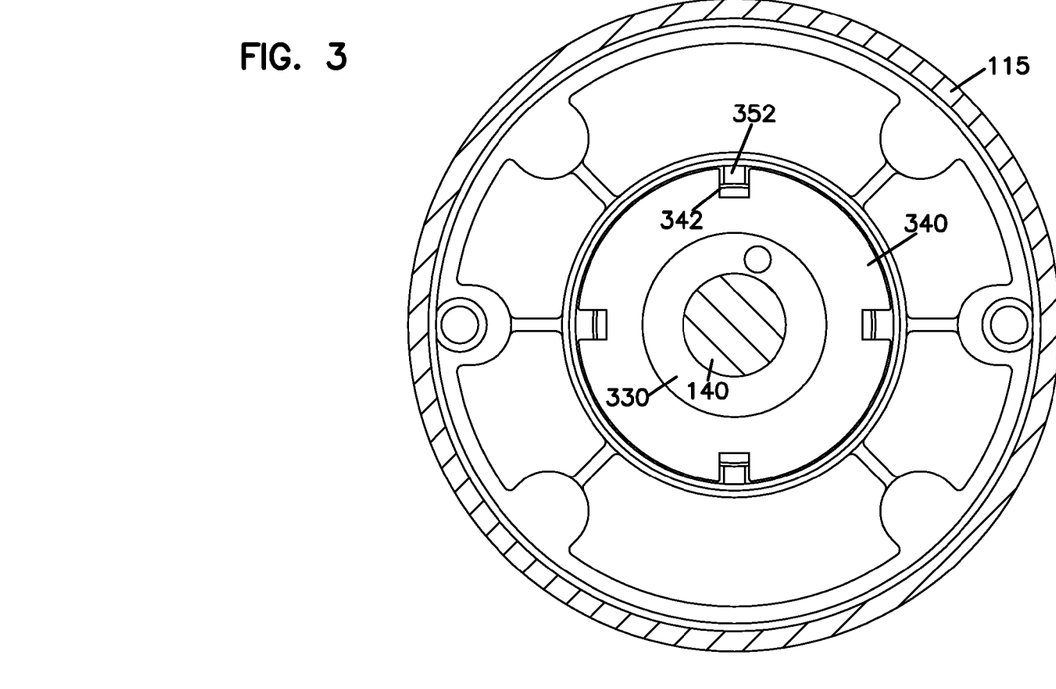
FIG. 3 is a partial cutaway end view of the motor of FIG. 1.
Figure 4:
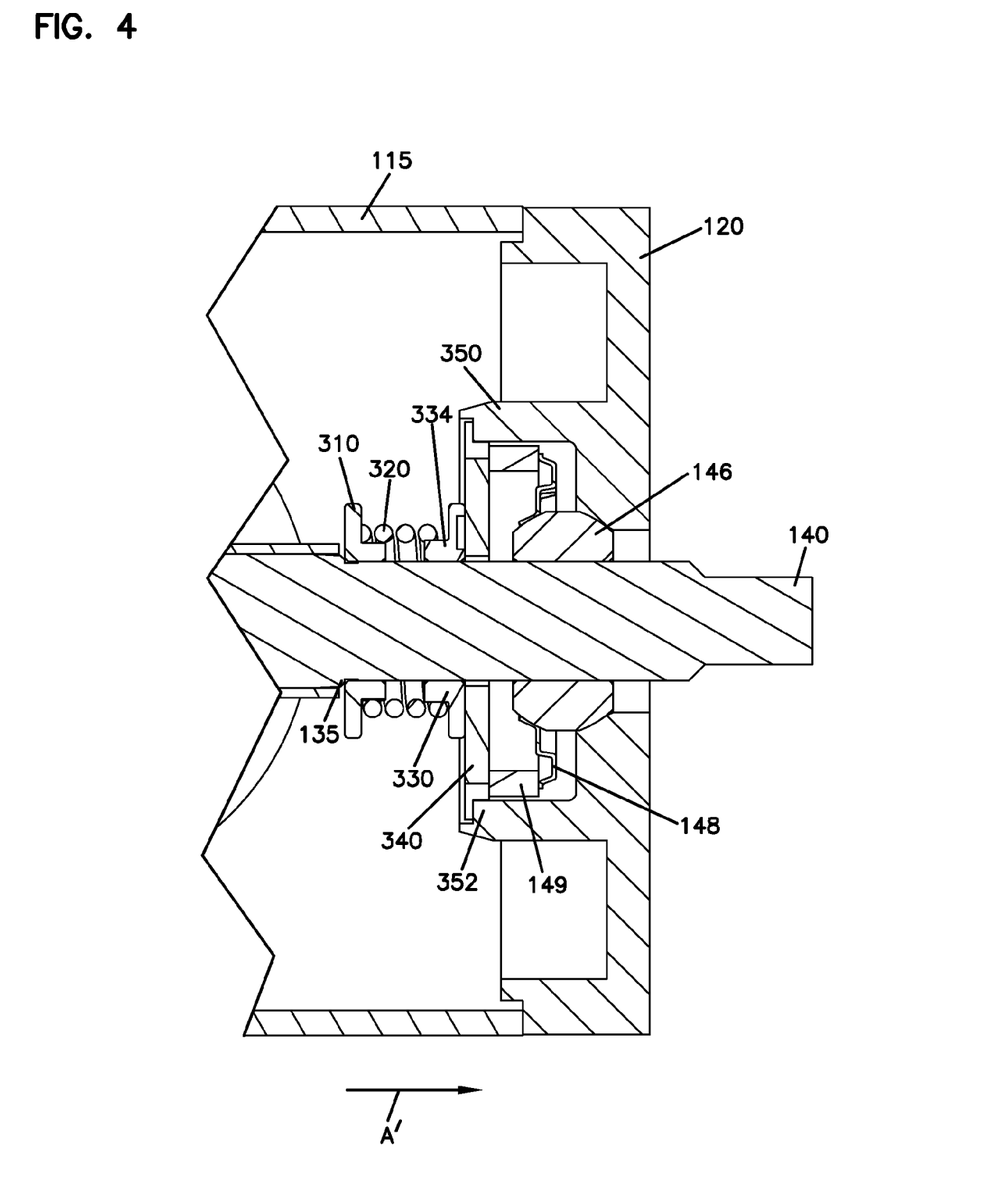
FIG. 4 is a partial cross-sectional view of the motor of FIG. 1.

Bushing 330 frictionally engages washer 340. When shaft 140 is stationary with electric motor 100 in the off state, the frictional engagement of bushing 330 and washer 340 creates a static holding torque. By varying the force at which spring 320 pushes bushing 330 towards washer 340, the frictional engagement of bushing 330 and washer 340, and the holding torque generated therebetween, can be optimized to maintain shaft 140 of motor 100 in place in the off state.

In example embodiments, the required static holding torque can be calculated and accomplished as a function of the surface friction between bushing 330 and washer 340, and the force applied by spring 320 to force bushing 330 against washer 340. For example, if more or less static holding torque is desired, a spring exhibiting a greater or lesser force can be used. In other embodiments, materials used for bushing 330 and/or washer 340 (e.g., exhibiting greater or lesser lubricity) can be varied to increase or decrease the holding torque.

In example embodiments, the holding torque created by brake mechanism 300 can be used to maintain shaft 140 of motor 100 in a static position when motor 100 is in an off state. For example, brake mechanism 300 can be used to maintain shaft 140 in a static position when a weight is coupled to motor 100 while motor 100 is in the off state.

In sample embodiments, the holding torque created by brake mechanism 300 decreases as motor 100 increases in rotational speed so that motor 100 can run efficiently when in an on state. For example, in the illustrated embodiment, brake mechanism 300 exhibits the highest frictional holding torque at 0 RPM, and the frictional holding torque decreases as the RPM increase. The lubricant impregnated into the bushing 330 can further reduce the friction between bushing 330 and washer 340 as shaft 140 rotates.

Figure 10:
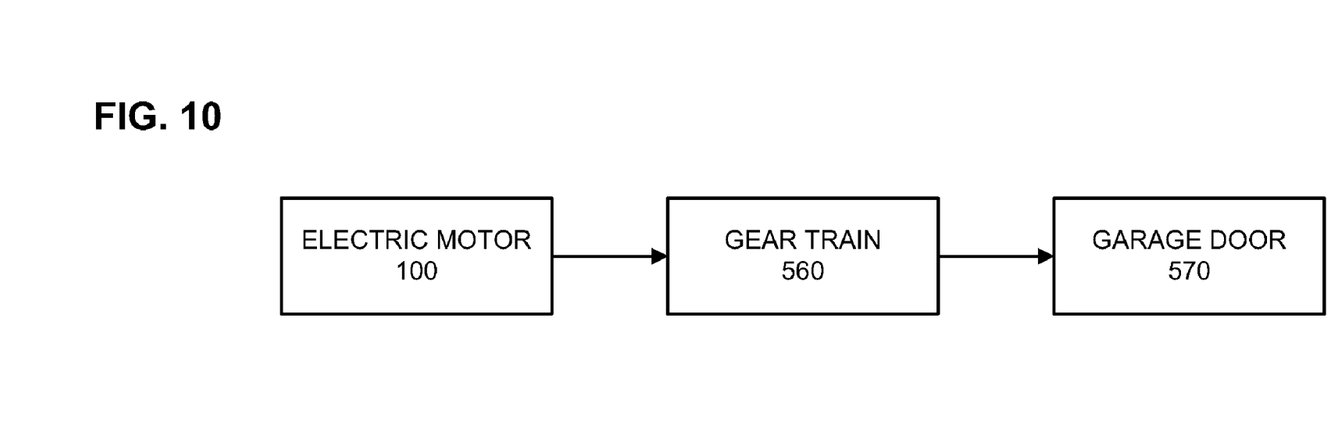
FIG. 10 is a schematic view of an example system including an electric motor and a garage door.

Referring now to FIG. 10, in one embodiment, motor 100 is used to raise and lower a garage door 570. Motor 100 is coupled to garage door 570 through a gear train 560. As motor 100 rotates in a first direction, torque from motor 100 is transferred through gear train 560 to raise door 570 to a raised position. As motor 100 rotates in a second opposite direction, torque from motor 100 is transferred through gear train 560 to lower door 570 to a lowered position.

When motor 100 is in the off state with door 570 in the raised position, brake mechanism 300 of motor 100 can be used in part (along with holding forces created by gear train 570 and a heavy spring associated with door 570) to hold door 570 in the raised position. When motor 100 is in the on state during raising or lower of door 570, static friction created by brake mechanism 300 can be overcome such that motor 100 can efficiently rotate to raise or lower door 570.

The example brake mechanisms disclosed herein can be used in other applications as well. For example, brake mechanisms can be used in applications in which a pre-load is desirable to keep the shaft of a motor from rotating while the motor is in an off state. Examples of such applications include pump motors, positioning system motors, and Heating Ventilation Air Conditioning ("HVAC") motors. Other alternative uses are possible.

The example brake mechanisms can also be positioned in different locations with respect to the other components of the motor. For example, in alternative embodiments, the brake mechanism can be located outside of the sleeve of the motor.

The above specification, examples and data provide a complete description of the manufacture and use of example embodiments disclosed herein. Since many embodiments can be made without departing from the spirit and scope of the disclosure, the invention resides in the claims hereinafter appended.

What is claimed is:

1. An electrical motor, comprising:
   a sleeve;
   a rotational assembly located in the sleeve;
   a shaft rotatably mounted about an axis extending longitudinally through the sleeve;
   an endcap;
   a bearing coupled to the shaft and positioned to engage the endcap;
   a brake mechanism located about the axis of the shaft, the brake mechanism including a spring and a first bushing, wherein the spring forces the first bushing against the bearing and the endcap to create a static frictional torque between the first bushing and the endcap when the motor is in an off state; and a washer located in the endcap, wherein the first bushing is forced against the washer by the spring to create the static frictional torque.

2. The motor of claim 1, wherein the spring is a coil compression spring.

3. The motor of claim 1, wherein the first bushing is impregnated with a lubricant.

4. The motor of claim 3, wherein the brake mechanism is located between an armature of the rotational assembly and the endcap.

5. The motor of claim 4, further comprising a second bushing coupled to the shaft, wherein the spring is located between the first bushing and the second bushing.

6. The motor of claim 1, wherein the brake mechanism is located in the sleeve of the motor.

7. The motor of claim 1, wherein the first bushing is impregnated with a lubricant.

8. An electrical motor, comprising:
a sleeve;
a rotational assembly including an armature and a commutator located in the sleeve;
a shaft rotatably mounted about an axis extending longitudinally through the sleeve;
an endcap defining an opening through which the shaft extends;
a bearing coupled to the shaft and positioned to engage the endcap;
a brake mechanism located about the axis of the shaft and between the armature and the endcap, the brake mechanism including a coil compression spring and a first bushing impregnated with a lubricant, wherein the spring forces the first bushing against the bearing and the endcap to create a static frictional torque between the first bushing and the endcap when the motor is in an off state; and
a washer located in the endcap, wherein the first bushing is forced against the washer by the spring to create the static frictional torque.

9. The motor of claim 8, further comprising a second bushing coupled to the shaft, wherein the spring is located between the first bushing and the second bushing.

10. A method for creating a static holding torque in an electric motor including a rotational assembly and a shaft, the method comprising:
locating a spring and a bushing about the shaft of the motor;
positioning the bushing adjacent to a washer;
forcing the bushing against the washer using the spring to create the static holding torque with the motor in an off state; and
decreasing the static holding torque between the bushing and the stationary portion as the shaft of the motor rotates when the motor is in an on state.

11. The method of claim 10, further comprising impregnating the bushing with a lubricant.

12. The method of claim 10, further comprising increasing the static holding torque by selecting the spring with a larger spring force.

13. The method of claim 10, further comprising using an endcap of the motor as the stationary portion.

14. The method of claim 13, further comprising locating the bushing and the spring between the rotational assembly and the endcap of the motor.

15. The method of claim 10, further comprising:
coupling the motor to a load;
allowing the motor to hold the load when the motor is in the off state; and
using the motor to move the load when the motor is in the on state.

16. The method of claim 15, wherein the load is a garage door.

17. The method of claim 10, further comprising:
coupling the motor to a garage door; and
allowing the motor to hold the garage door in a given position when the motor is the off state.

18. The method of claim 17, further comprising using the motor to move the garage door when the motor is in the on state.

* * * * *